United States Patent
Grant et al.

(10) Patent No.: US 10,459,098 B2
(45) Date of Patent: Oct. 29, 2019

(54) SYSTEM AND METHOD FOR AUTOMATICALLY CORRELATING GEOLOGIC TOPS

(71) Applicant: Drilling Info, Inc., Austin, TX (US)

(72) Inventors: Christian W. Grant, Austin, TX (US); Dean Clifford Witte, Austin, TX (US)

(73) Assignee: DRILLING INFO, INC., Austin, TX (US)

( * ) Notice: Subject to any disclaimer, the term of this patent is extended or adjusted under 35 U.S.C. 154(b) by 1235 days.

(21) Appl. No.: 14/254,718

(22) Filed: Apr. 16, 2014

(65) Prior Publication Data
US 2014/0316706 A1  Oct. 23, 2014

Related U.S. Application Data

(60) Provisional application No. 61/813,124, filed on Apr. 17, 2013.

(51) Int. Cl.
*G01V 1/36*  (2006.01)

(52) U.S. Cl.
CPC .......... *G01V 1/362* (2013.01); *G01V 2210/52* (2013.01); *G01V 2210/522* (2013.01)

(58) Field of Classification Search
None
See application file for complete search history.

(56) References Cited

U.S. PATENT DOCUMENTS 4,633,400 A    12/1986  Chittineni
5,003,813 A *   4/1991  Hayes ..................... G01M 3/02
                                                 340/605

(Continued)

FOREIGN PATENT DOCUMENTS

WO   WO 2010/110824   9/2010
WO   WO 2011/100009   8/2011

OTHER PUBLICATIONS

Fitsum Admasu, Automatic Method for Correlating Horizons across Faults in 3D Seismic Data, In Proceedings of the IEEE Conference on Computer Vision and Pattern Recognition, Washington DC, Jun. 2004.*

(Continued)

*Primary Examiner* — John E Breene
*Assistant Examiner* — Brandon J Becker
(74) *Attorney, Agent, or Firm* — DLA Piper LLP (US)

(57) ABSTRACT

A system and method are provided for automatically correlating geologic tops. The system receives well logs from different well bores and one or more user seed picks identifying a well top to be correlated. Each of the seed picks is added to a priority queue ordered by each pick's confidence. User selected picks are assigned the highest level of confidence. The system performs correlation by selecting a window of well log data about a user's manual pick, selected from the top of the priority queue, and then finding the best optimal match with a corresponding window in a neighboring wellbore. That new pick is then estimated in the target well using a correlation function. A quality value and a confidence value may then be calculated for each pick using some correlation function, for example dynamic time warping, and added to the priority queue according to the confidence value. The system may be configured so that picks that fall below a preset quality or confidence value may be discarded and not added to the queue. The system may then move on to the next pick in the priority queue.

36 Claims, 14 Drawing Sheets

(56) References Cited

U.S. PATENT DOCUMENTS

| | | | |
|---|---|---|---|
| 5,056,066 A | 10/1991 | Howard | |
| 5,835,882 A | 11/1998 | Vienot et al. | |
| 5,987,388 A | 11/1999 | Crawford | |
| 6,223,126 B1 | 4/2001 | Neff et al. | |
| 6,295,504 B1* | 9/2001 | Ye | G06K 9/622 |
| | | | 702/11 |
| 6,965,383 B2 | 11/2005 | Ritter et al. | |
| 7,054,753 B1 | 5/2006 | Williams et al. | |
| 7,069,149 B2 | 6/2006 | Goff | |
| 7,516,055 B2 | 4/2009 | Strebelle et al. | |
| 7,525,349 B2 | 4/2009 | Mavoori et al. | |
| 8,265,876 B1* | 9/2012 | Yu | G01V 1/301 |
| | | | 702/16 |
| 8,826,879 B2 | 9/2014 | Lee | |
| 9,182,511 B2 | 11/2015 | Neave | |
| 9,418,339 B1* | 8/2016 | Leonard | G06F 17/18 |
| 9,618,639 B2 | 4/2017 | Witte et al. | |
| 2004/0015296 A1 | 1/2004 | Causse et al. | |
| 2004/0220790 A1 | 11/2004 | Cullick et al. | |
| 2004/0260476 A1 | 12/2004 | Borgos | |
| 2006/0052937 A1 | 3/2006 | Zoraster et al. | |
| 2006/0075007 A1 | 4/2006 | Anderson et al. | |
| 2006/0193205 A1* | 8/2006 | Herkenhoff | G01V 1/362 |
| | | | 367/47 |
| 2006/0274386 A1 | 12/2006 | Wakazono et al. | |
| 2007/0276604 A1 | 11/2007 | Williams | |
| 2008/0033935 A1* | 2/2008 | Frank | G06F 3/0481 |
| 2009/0043507 A1* | 2/2009 | Dommisse | G01V 1/34 |
| | | | 702/6 |
| 2009/0125288 A1 | 5/2009 | Main et al. | |
| 2009/0141028 A1* | 6/2009 | Arora | G06F 17/10 |
| | | | 345/440 |
| 2009/0144032 A1* | 6/2009 | Arora | G06F 17/10 |
| | | | 703/2 |
| 2009/0157319 A1 | 6/2009 | Mitchell | |
| 2009/0319243 A1 | 12/2009 | Suarez-rivera et al. | |
| 2010/0125349 A1 | 5/2010 | Abasov et al. | |
| 2010/0214870 A1 | 8/2010 | Pepper et al. | |
| 2011/0002194 A1 | 1/2011 | Imhof et al. | |
| 2011/0011595 A1 | 1/2011 | Huang et al. | |
| 2011/0042098 A1 | 2/2011 | Imhof | |
| 2011/0115787 A1 | 5/2011 | Kadlec | |
| 2011/0122136 A1 | 5/2011 | Jo | |
| 2011/0172976 A1 | 7/2011 | Budiman et al. | |
| 2011/0181610 A1 | 7/2011 | Baggs et al. | |
| 2011/0213577 A1 | 9/2011 | Mousavi et al. | |
| 2011/0313743 A1 | 12/2011 | Oury et al. | |
| 2012/0010865 A1 | 1/2012 | Benson | |
| 2012/0080197 A1 | 4/2012 | Dickens et al. | |
| 2012/0253770 A1 | 10/2012 | Stern et al. | |
| 2013/0090855 A1 | 4/2013 | Rasmus et al. | |
| 2013/0169644 A1 | 7/2013 | Bolton et al. | |
| 2013/0229891 A1 | 9/2013 | Witte et al. | |
| 2013/0262052 A1 | 10/2013 | Mallet et al. | |
| 2013/0332131 A1* | 12/2013 | Russell | G06F 17/5009 |
| | | | 703/10 |
| 2014/0140580 A1 | 5/2014 | Neave | |
| 2014/0142906 A1 | 5/2014 | Berezin et al. | |
| 2014/0222347 A1 | 8/2014 | Bashore | |
| 2014/0254884 A1 | 9/2014 | Elkington et al. | |
| 2014/0262246 A1 | 9/2014 | Li et al. | |
| 2015/0098627 A1 | 4/2015 | Ye | |
| 2015/0198029 A1 | 7/2015 | Chen | |
| 2016/0139282 A1 | 5/2016 | Dimitrov | |
| 2016/0237810 A1 | 8/2016 | Beaman, Jr. et al. | |
| 2017/0108614 A1 | 4/2017 | Neave et al. | |
| 2018/0253873 A1 | 9/2018 | Witte et al. | |

OTHER PUBLICATIONS

Souhei Morita, Extracting time-ordered pairs of similar subsequences by time warping approach, 3rd International Workshop on Mining Temporal and Sequential Data, Aug. 22, 2004.*

PCT/US13/68348, PCT International Search Report dated Apr. 29, 2014 (3 pgs.).
PCT/US13/68348, PCT Written Opinion of the International Searching Authority dated Apr. 29, 2014 (4 pgs.).
PCT/US13/68348, PCT International Preliminary Report on Patentability dated May 5, 2015 (5 pgs.).
PCT/US13/68349, PCT International Search Report dated Jan. 30, 2014 (3 pgs.).
PCT/US13/68349, PCT Written Opinion of the International Searching Authority dated Jan. 30, 2014 (5 pgs.).
PCT/US13/70838, PCT International Search Report dated Apr. 9, 2014 (3 pgs.).
PCT/US13/70838, PCT Written Opinion of the International Searching Authority dated Apr. 9, 2014 (5 pgs.).
PCT/US13/70838, PCT International Preliminary Report on Patentability dated May 26, 2015 (6 pgs.).
PCT/US14/34546, PCT International Search Report dated Sep. 22, 2014 (3 pgs.).
PCT/US14/34546, PCT Written Opinion of the International Searching Authority dated Sep. 22, 2014 (8 pgs.).
PCT/US14/34546, PCT International Preliminary Report on Patentability dated Oct. 7, 2014 (12 pgs.).
Admasu et al., Automatic Method for Correlating Horizons Across Faults in 3d Seismic Data, Computer Vision and Pattern Recognition, 2004, CVPR 2004, Proceedings of the 2004 IEEE Computer Society Conference, vol. 1 (6 pgs.).
Andersen, et al., Seismic Waveform Classification: Techniques and Benefits, dated Mar. 2004; pp. 26-29 (4 pgs.).
Aurnhammer et al., A Genetic Algorithm for Automated Horizon Correlation Across Faults in Seismic Images, IEEE Transactions on Evolutionary Computation, vol. 9., No. 2, Apr. 2005 (10 pgs.).
Brown et al., Seismic Event Tracking by Global Path Optimization, 76th Annual International Meeting, SEG, Expanded Abstracts, 1063-1067, 2006 (4 pgs).
Castro de Matos, et al., *Unsupervised Seismic Facies Analysis Using Wavelet Transform and Self-Organizing Maps*, dated Dec. 13, 2006; vol. 72, No. 1, pp. P9-P21, 19 Figs. (13 pgs.).
Coleou, et al.; *Unsupervised Seismic Facies Classification: A Review and Comparison of Techniques and Implementation*, The Leading Edge, dated Oct. 2003; pp. 942-953; (7 pgs.).
Diersen et al., Classification of Seismic Windows Using Artificial Neural Networks, dated 2011; pp. 1-10 (10 pgs.).
Dijkstra; A Note on Two Problems in Connexion with Graphs, Numerische Mathematik 1, pp. 269-271, dated Jun. 11, 1959 (3 pgs.).
Hollt et al., Interactive Seismic Interpretation with Piecewise Global Energy Minimization, dated Mar. 1, 2011, pp. 59-66 (8 pgs.).
Jeong et al., A Fast Iterative Method for Eikonal Equations, SIAM J. Sci. Comput., vol. 30, No. 5, pp. 2512-2534, dated Jul. 23, 2008 (23 pgs.).
Kass et al., *Snakes: Active Contour Models*, International Journal of Computer Vision, 321-331, 1988 (11 pgs).
Mortensen et al., *Interactive Segmentation with Intelligent Scissors*, Graphical Models and Image Processing, 60(5):349-384 (1998) (48 pgs).
Ouenes et al., Practical Use of Neural Networks in Tight Gas Fractured Reservoirs: Application to the San Juan Basin, Paper SPE 39965 (1998) (8 pgs.).
Roy, et al., Automatic Seismic Facies Classification with Kohonen Self Organizing Maps—a Tutorial, dated Dec. 2010; pp. 6-14; (9 pgs.).
Valk et al., *Investigation of Key Parameters in SAGD Wellbore Design and Operation*, Journal of Canadian Petroleum Technology, vol. 46, No. 6, Jun. 2007 (8 pgs.).
Welch et al., *Free Form Shape Design Using Triangulated Surfaces*, Computer Graphics, 28, Proc. SIGGRAPH '94, 1994 (preprint) (10 pgs).
Wikipedia. Wikipedia, Overfitting. Revision from Aug. 23, 2012. pp. 1-3. Retrieved from http://en.wikipedia.org/w/index.php?title=Overfitting&oldid=508784472 (3 pgs.).
Forth et al., *Application of Statistical Analysis to Optimize Reservoir Performance*, Journal of Canadian Petroleum Technology, Sep. 1, 1997 (7 pgs.).

(56) References Cited

OTHER PUBLICATIONS

Herrera, *Automated Seismic-to-well Ties?*, 7th EAGE Conference & Exhibition incorporating SPE EUROPEC 2012, Jun. 1, 2012 (5 pgs.).

Yang, *Integrated Reservoir Description from Seismic, Well Log, to Production Data*, SPE 38381 © May 18, 1997 (9 pgs.).

Zoraster et al., *Curve Alignment for Well-to-Well Log Correlation*, SPE 90471, SPE Annual Technical Conference and Exhibition, Dec. 31, 2004 (6 pgs.).

Bunyamin Can, Thesis, Submitted to the Office of Graduate Studies of Texas A&M University, "*Probabilistic Performance Forecasting for Unconventional Reservoirs with Stretched-Exponential Model*", Diss. Masters of Science, Texas A&M University, May 2011 (74 pgs.) (2011).

C.T. Philip Chang et al., "*NMR Characterizations of Properties of Heterogeneous Media*", Research Report, Final Report for the Period May 1999-Dec. 2004; U.S. Dept. of Energy, DOE Award No. DE-AC26-99BC15202, Texas A&M University, 2005, pp. 1-151 (151 pgs.) (2005).

Dr. Jerry I. Hintze.. NCSS Statistical System, *NCSS Data Analysis, "User's Guide III, Regression and Curve Fitting*", NCSS 2007. Retrieved from http://ncss.wpengine.netdna-cdn.com/wp-content/uploads/2012/09/NCSSUG3.pdf (653 pgs.) (2007).

Neuralog, Well Log Digitizing Software—Log Digitizing, Pages from Website: http://www.neuralog.com/pages/NeuraLog.html, printed Dec. 3, 2015 (2 pages) (2015).

Goshtasby "Chapter 2: Similarity and Dissimilarity Measures" Image Registration Principle, Tools and Methods, 2012, XVIII, pp. 7-66 (2012).

T.J. Hastie et al. "Generalized additive models"—Chapter 7 Statistical Models in S eds, dated 1992 (15 pgs.).

Lineman et al.: Well-to-Well Log Correlation Using Knowledge-Based Systems and Dynamic Depth Warping, dated Jan. 1, 1987 (Jan. 1, 1987); XP055327735, Retrieved From the Internet URL: https://dspace.mit.edu/bitstream/handle/1721.1/75091/1987.14Lineman et al.Pdf?sequence=1 [retrieved on Dec. 9, 2016] (34 pgs.).

\* cited by examiner

```
// User well and well log data section // Steps 1 and 2 printem id correlateTops() { delimitWellsOnTopsNew( _we ilBores); // One-time Delaunay Triangulation. Step 4

// Set up confidence priority queue . Step 5
Comparator<DTWNode> c = new DTWNode.DTWNodeConfidenceComparator();
PriorityQueue<DTWNode> queue = new PriorityQueue<DTWNode>();

// Set the unprocessed seed nodes. Step 6
setSeedNodes(queue);

/*
 * Process the confidence queue. Seed nodes are set to a quality of one, so
 * they will get processed first. Continue to add nodes to queue with a passing
 * confidence measure.
 */
while (queue.size() > 0) {
    DTWNode sourceNode = queue.poll();

final Double pickDepth = sourceNode.getSampleToMap();
```

FIG. 8

```
TriMesh.Node csn = sourceNode.getTriNode();
TriMesh.Node[] neighbors = _triMesh.getNodeNabors(csn);

// Loop over all of the natural neighbors of the source node. Step 7
for (TriMesh.Node csn : neighbors) {
    DTWNode targetNode = getDTWNodeFromTriNode( csn);

// targets cannot be seed nodes
    if (targetNode.isSeed()) {
        continue;
    }

// Get the data. Step 7
    List<Pair<double[], float[]>> logData = getLogData(
        sourceNode, targetNode, __log);

// Bail if the data is bad or incomplete
    if (logData == null) {
```

Pair<double[], float[]> sourceData = logData.get(0);
Pair<double[], float[]> targetData = logData.get(1);

// Note that any form of DTW can be used. Step 8 (Appendix 1)
DTWTransform dtw = getNewDTW(C_useWindow);
dtw.setArrays(sourceData.getA(), sourceData
    .getB(), targetData.getA(),
    targetData.getB());

// Compute the Dynamic Time Warping Cost Function. Step 8 dtw.buildCostMatrices();

double mappedSample = dtw.mapSamples(trickDepth);

// Compute Pearson's quality measure. Step 9
double quality = dtw.getWarpedQuality();

// Test if quality (q) passes user-set threshold. Step 10
if (quality < qualityThreshold) {
continue; // Did not make the quality cutoff ... next target node
}
```

FIG. 10

```
// Compute the confidence from parent seed. Step 11
double confidence = sourceNode.getConfidence() * quality;

// Test if it has met the confidence threshold. Step 12
if(confidence < _confidenceThreshold) {
    continue ;
}

/*
 * It has met the quality & confidence thresholds. Now test
 * the confidence against the current confidence that is at
 * the target node. If it is better, then set the target node
 * information and re-parent this target node to the source
 * node. Then add this target onto the queue. Step 13
 */
double targetConfidence = targetNode.getConfidence();

if(confidence < targetConfidence) {
    continue;
}
```

FIG. 11

```
targetNode.setQuality(quality);
targetNode.setParent(sourceNode);
targetNode.setConfidence(
confidence);
targetNode.setSampleToMap(mappedSample);  // Step 14
targetNode.setPickStatus(PickStatus.PICKED);
targetNode.setIsPicked(true);

// Add to queue for reprocessing. Stop when all nodes processed.
Step 15 queue.add(targetNode);
    }
   }
  }
...end
```

FIG. 12

SYSTEM AND METHOD FOR AUTOMATICALLY CORRELATING GEOLOGIC TOPS

PRIORITY CLAIM/RELATED APPLICATIONS

This application claims the benefit under 35 USC 119(e) to U.S. Provisional Patent Application Ser. No. 61/813,124 filed on Apr. 17, 2013 and titled "System and Method for Automatically Correlating Geologic Tops", the entirety of which is incorporated herein by reference.

APPENDIX

Appendix A (8 pages) contains more details of a time warping method used in the method. Appendix A forms part of the specification and is incorporated herein by reference.

FIELD

Aspects of the present disclosure relate to a system and process for interpreting geologic formations using data acquired from a wellbore. More particularly, aspects of the present disclosure involve a computing system configured to assist an analyst to rapidly and accurately identify and model subterranean geologic formations in three-dimensions.

BACKGROUND

In geology and geology related fields, stratigraphy involves the study of the layers of rock and soil that make up the subterranean landscape. In the field of oil and gas exploration, the identification of the strata of an area is especially important because possible locations of oil and gas deposits may be identified from the stratum. Furthermore, the identification of faults is particularly important for not only identifying potential locations for resources, but for safely drilling wells. In order to identify the various strata in the subterranean landscape, geologists are tasked with reviewing data in the form of well logs.

A well log is a record of the geologic formations that are penetrated by a wellbore. These well logs may then be analyzed by geologists to identify well tops, or stratigraphic contacts penetrated by the wellbore. Usually, well logs from an area such as an oil field or a portion of an oil field are displayed as a two or three-dimensional figure. The geologist starts at a well log in one well bore, identifies a well top, and identifies the corresponding well top in the same well log in other well bores. As oil fields increase in size, analyzing a three-dimensional collection of well logs with such conventional techniques becomes increasingly difficult and time consuming. Furthermore, as the number of well logs and well bores increase, the likelihood of achieving consistently accurate results decreases and different geologists may interpret the same data in a significantly different manner.

It is with these and other issues in mind that various aspects of the present disclosure were developed.

BRIEF DESCRIPTION OF THE DRAWINGS

FIGS. 8-12 illustrate an example of pseudocode that implements the automated tops correlation.

DETAILED DESCRIPTION OF ONE OR MORE EMBODIMENTS

Figure 1:
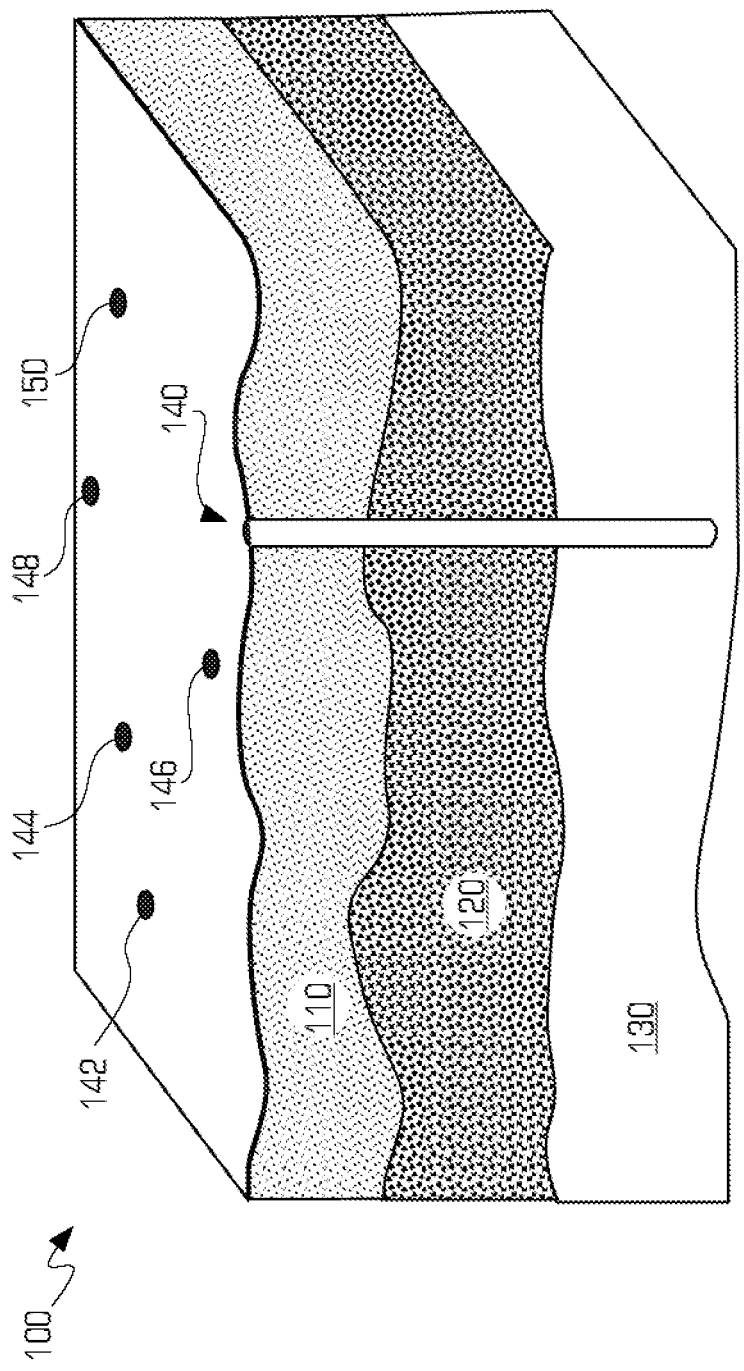
FIG. 1 depicts an example of wellbores penetrating strata in an oil field.

The disclosure is particularly applicable to a system and method for automatically correlating geologic tops using at least one process such as in a general purpose computing system as described below and it is in this context that the disclosure will be described. It will be appreciated, however, that the system and method has greater utility since the system and method may be implemented using other computer systems and models, such as a client server computer system, a mainframe computer system with a terminal, a standalone computer system, a cloud based computer system or a software as a service (SaaS) model. For example, in a SaaS model implementation of the system, the computing system would be one or more computing resources, such as one or more server computer or one or more cloud computing resources) in a backend component that has at least one processor that executes a plurality of lines of computer code so that the at least one processor implements the method described below. A user, using a different computing device such as a desktop computer, laptop computer, tablet computer and the like, may couple to the backend component over a communication path, such as a wired or wireless computer network, cellular network, etc., to upload seismic data to the backend component that performs the automatic correlation of the geologic tops and returns the results to the user in the form for user interface data that may be displayed by the user on the computing device.

According to one aspect, a system and method is provided for automatically correlating geologic tops using at least one processor. The system receives well logs from different well bores and one or more user seed picks identifying a well top to be correlated. Each of the seed picks is added to a priority queue ordered by each pick's confidence. User selected picks are assigned the highest level of confidence. The system performs correlation by selecting a window of well log data about a user's manual pick, selected from the top of the priority queue, and then finding the best optimal match with a corresponding window in a neighboring wellbore. That new pick is then estimated in the target well through some correlation function. A quality value and a confidence value may then be calculated for each pick using some correlation function, for example dynamic time warping, and added to the priority queue according to the confidence value. The system may be configured so that picks that fall below a preset quality or confidence value may be discarded and not added to the queue. The system may then move on to the next pick in the priority queue.

Implementations of the present disclosure involve a system and method for automatically correlating geologic tops. In particular, the present disclosure provides for a system and method that receives a suite of well logs and is able to automatically correlate a well top identified by a user across many well bores using the provided well logs. The well top identified by the user is designated as a "seed pick" that identifies a well top to be correlated. The system then utilizes the seed pick to find corresponding locations of well tops ("picks") in each of the provided well logs by performing dynamic time warping on the well logs and following a path through the provided well bores that yields the highest confidence of picks.

Referring to FIG. 1, an example oil field 100 is depicted. In this example, three layers of strata 110, 120, 130 are illustrated, but it should be understood that strata may vary in thickness from a few feet to tens of feet. Thus, a thousand foot deep well bore may penetrate hundreds of strata that may or may not have consistent thicknesses and may not be at consistent depths throughout the oil field 100. The depicted oil field 100 also includes many boreholes 140-150 penetrating the surface and passing through the strata.

Figure 2:
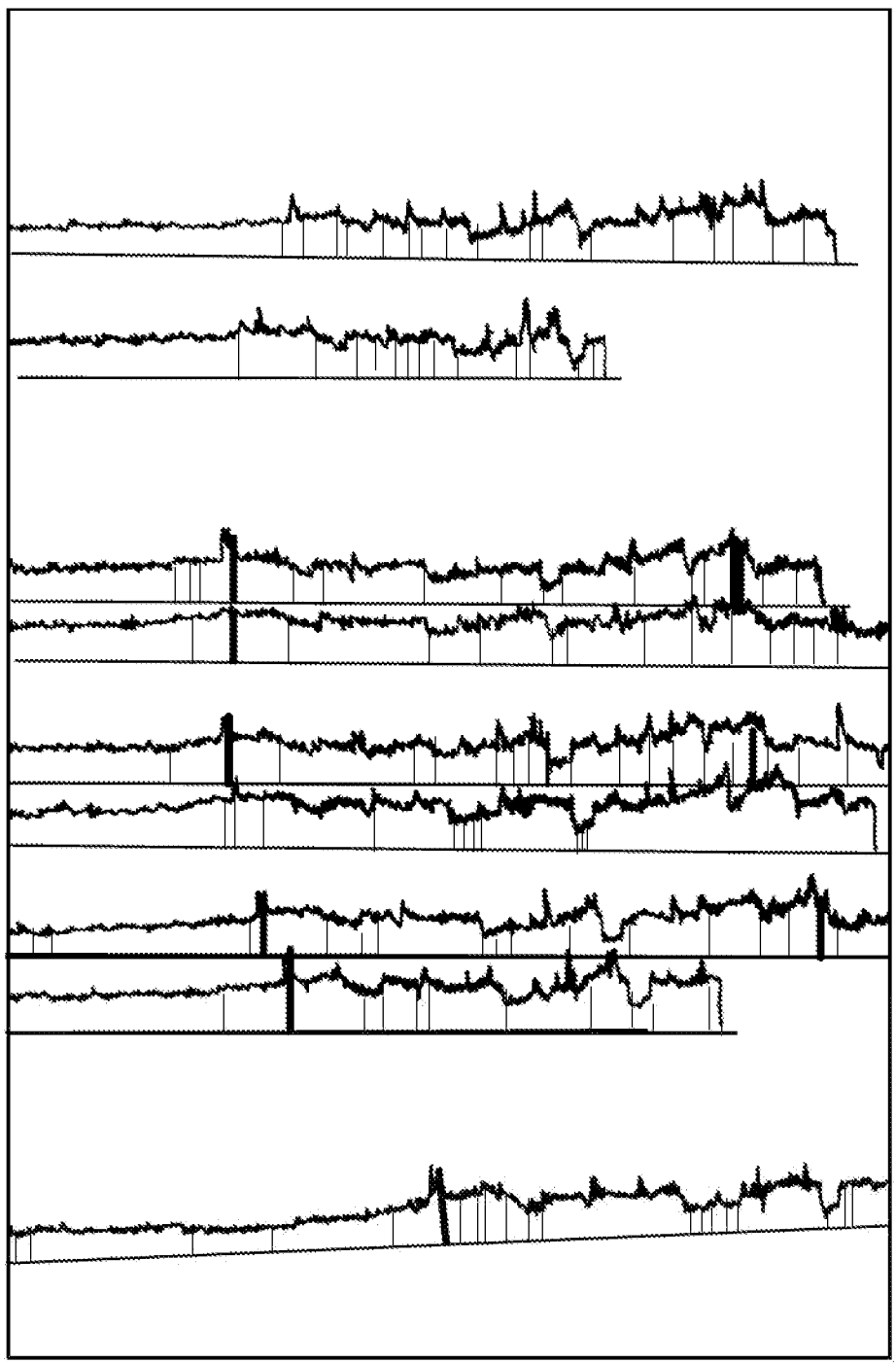
FIG. 2 depicts an example three-dimensional plot of well logs along with their respective well bores positioned according to location.

Referring to FIG. 2, an example of one well log taken at nine different well bores is depicted. In this example, the well logs are created by measuring various attributes of the underground formations. The diagram is in three-dimensions such that the well logs are spaced relative to their actual physical locations and the top of the diagram are measurements at ground level and depths decrease down the page. The varying widths in the well log signature represent the changing strata with depth. For example, depending on the composition of the strata, emitted gamma radiation may increase or decrease, resulting in a peak or a trough in the well log. The resulting measurements are then visually depicted as wider or narrower bars in the well logs. Thus, if a continuous area of a well log emits a similar amount of gamma radiation, the well log shows a consistent width. A geologist viewing the well log may then determine that that area is made up of a consistent layer of a certain type of strata and is a single well top.

Figure 3A:
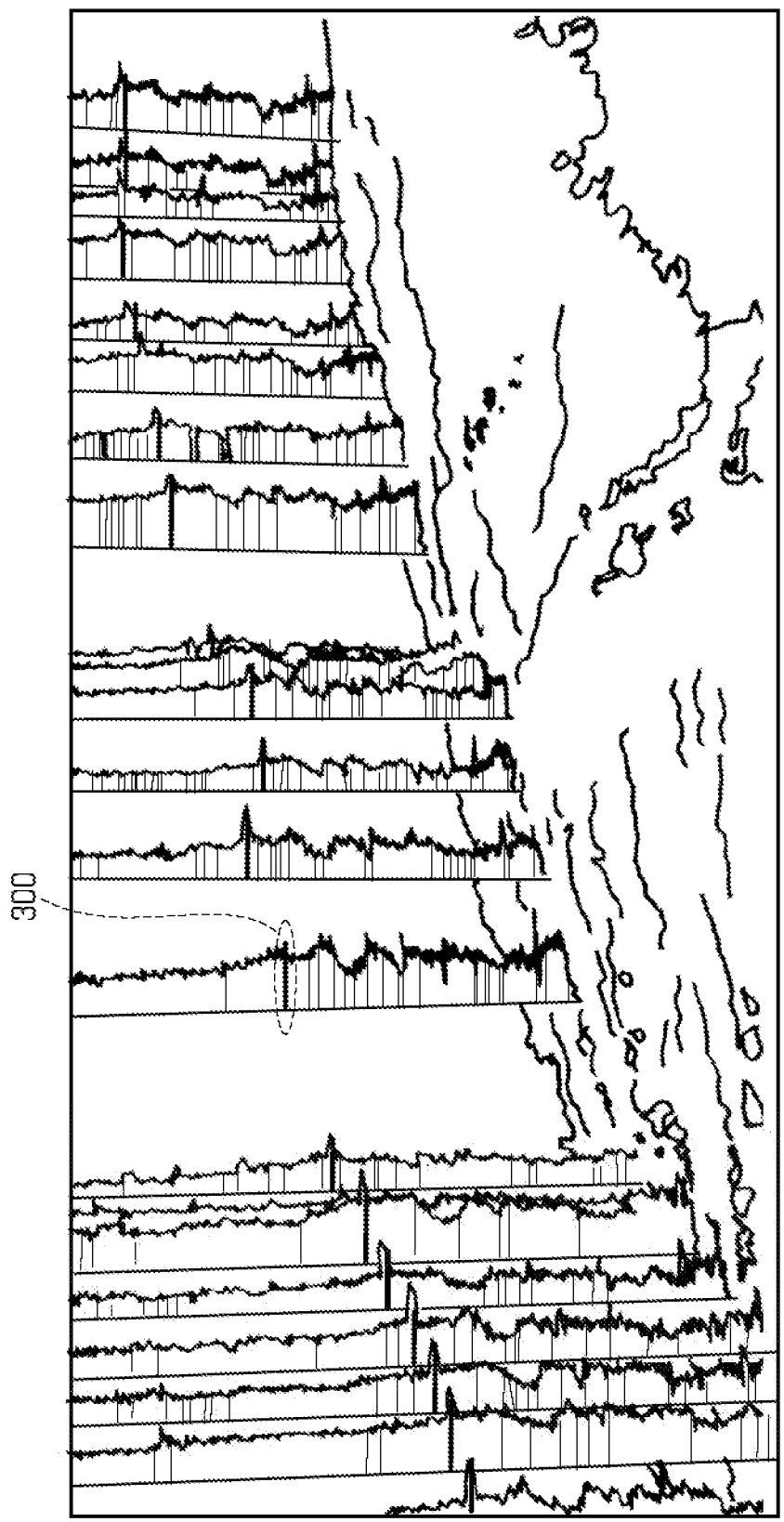
FIGS. 3A-3C each depict an example three-dimensional plot of well logs positioned according to location with a well top identified across multiple well logs.
Figure 3B:
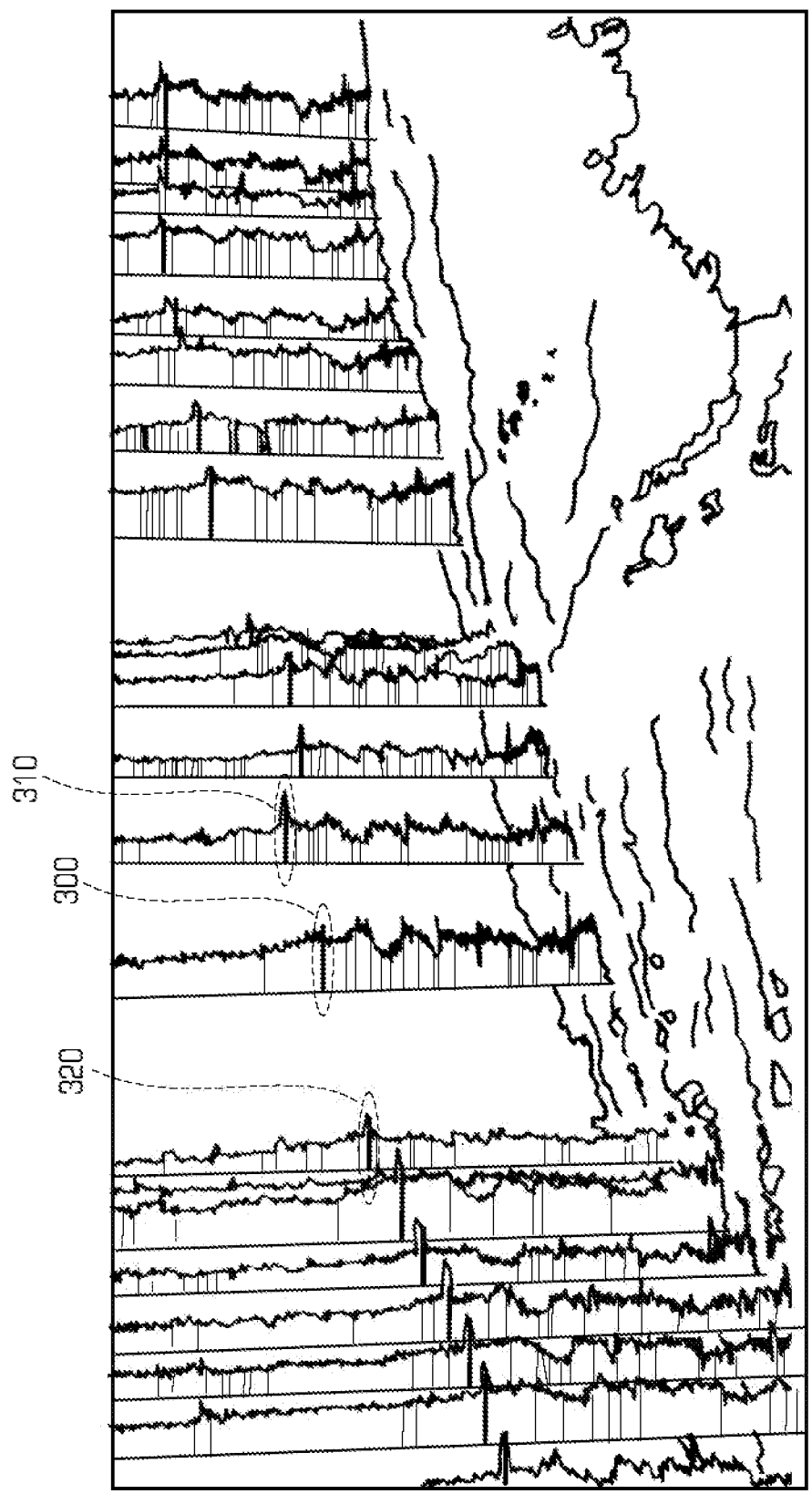
Figure 3C:
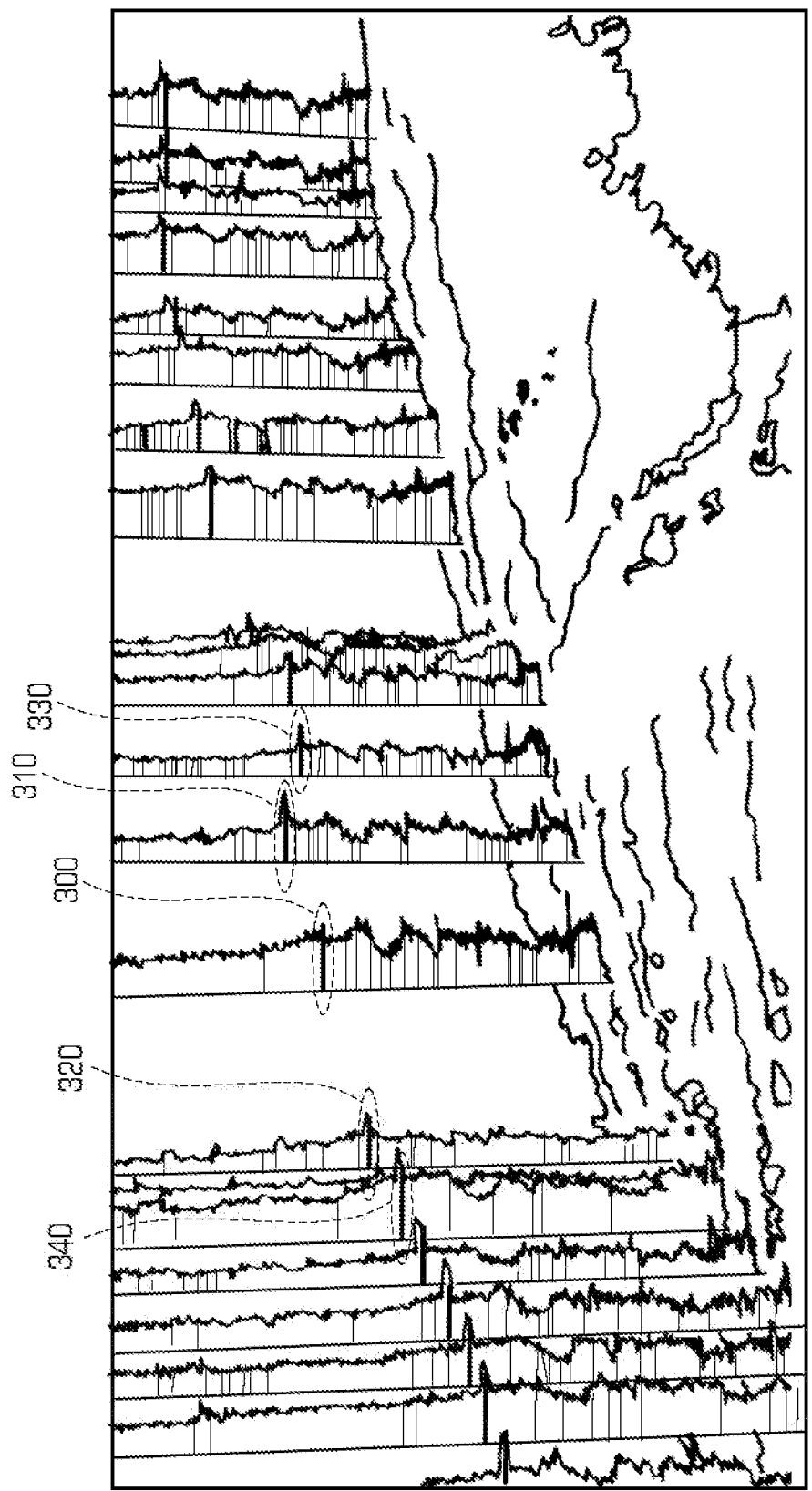

Referring to FIG. 3A, well logs are depicted with a seed pick 300 that has been selected by a user. The system operates by finding a location in the other well logs that corresponds to a seed pick 300. The user identifies a well top and selects that position of well log as a seed pick. The seed pick may be graphically illustrated by overlaying an indicator at the location of the well top on a well log. This may be done by starting at the well logs that are physically closest to the well bore with the seed pick. Each of the neighboring well bore's well logs are evaluated and picks corresponding to the seed pick are correlated for each well log. Each pick that is correlated is recorded and is also assigned a quality value based on how well it matches the seed pick and a monotonically non-increasing confidence value that is a combination of the seed pick's confidence and the new pick's quality. The process is then repeated using the pick with the highest quality value and correlating that pick with the well logs of its neighbors. The process is repeated with the highest confidence picks until a pick has been made at each well bore or until no remaining picks may be made (e.g. if the correlation fails). For example, referring to FIG. 3B, the seed pick 300 was used to pick the same well tops at a first correlated pick 310 and a second correlated pick 320. Referring now to FIG. 3C, the first and second picks 310, 320 may then be used to correlate a third pick 330 and a fourth pick 340. Thus, the system starts at the seed pick and then the correlation propagates through the well logs.

Figure 4:
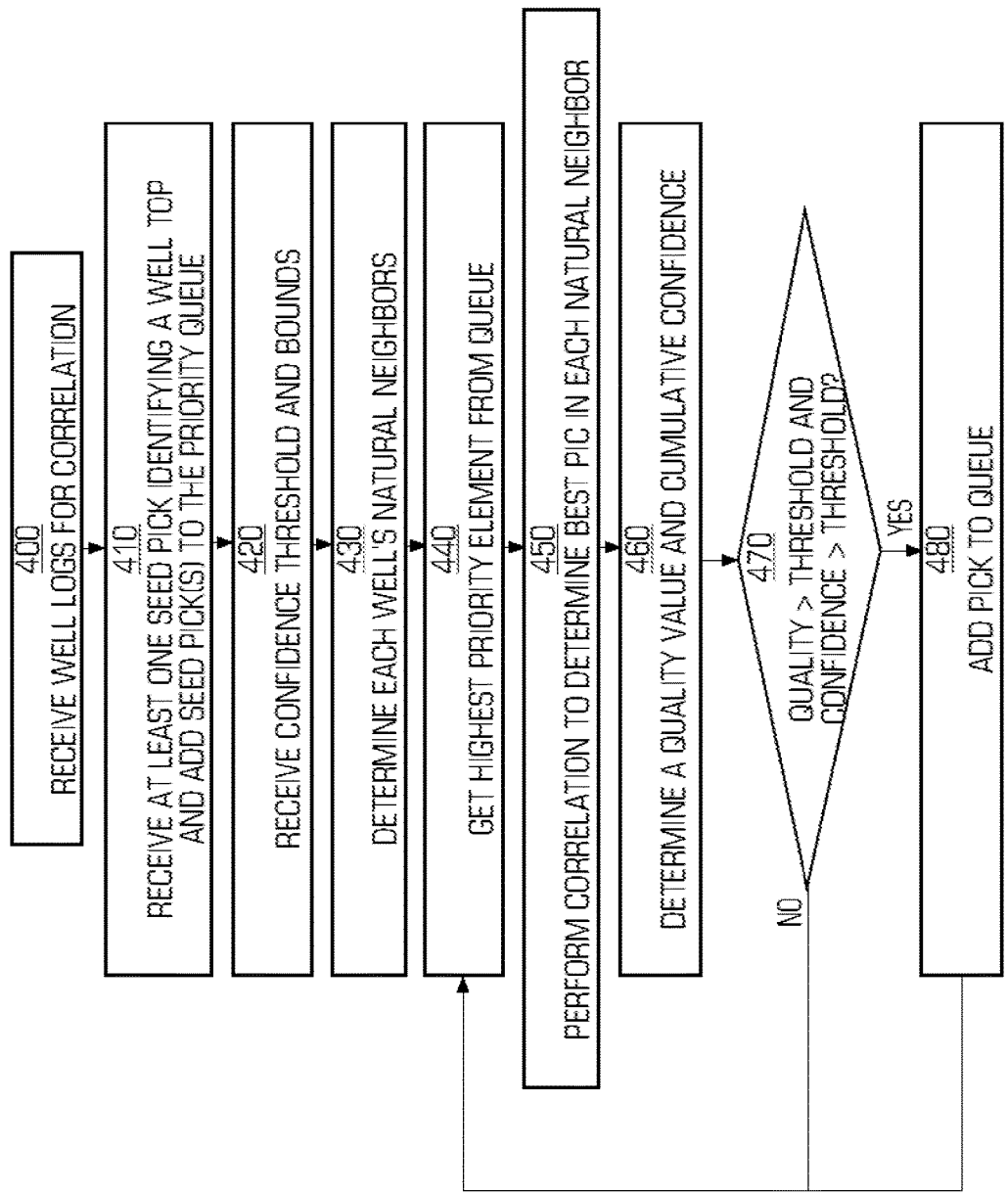
FIG. 4 depicts an example method for performing automated tops correlation.

Referring to FIG. 4 a method of automatically correlating geologic tops is depicted. According to one aspect, the automated tops correlation is initiated by a user selecting one or more well logs from a set of well bores for analysis (operation 400). FIGS. 8-12 are together a piece of exemplary pseudocode that may implement the automated tops correlation method shown in FIG. 4. The method shown in FIG. 4 may be implemented as code that is executed by a processor of a computer system wherein the code causes the processor to perform the various processes of the method as described below.

There must be a minimum of two well bores, each with one well log. Generally, the data will consist of a much larger set of well bores. For example, a group of well bores may include all or a subset of well bores spanning an entire oil field (possibly hundreds of well bores). The user may select at least one seed pick that is part of a well top from the provided well logs (operation 410). The at least one seed picks may each be assigned a maximum confidence value and added to a priority queue that is prioritized by confidence values. For example, the confidence values may range from 0 to 1 or 0 to 100 percent, with a confidence of 1 or 100 percent being the highest. In this case, seed picks would be assigned a confidence value of 1 or 100 percent.

The confidence priority queue may include elements containing an identifier for each well bore in the queue, a confidence value for each pick, and any other information for performing the correlation. The queue may be configured as a priority queue based on an element's confidence value. The confidence priority queue may initially contain any seed picks, but as correlation is performed, new elements are added to the confidence priority queue for each pick made by the system according to their confidence value.

Figure 5:
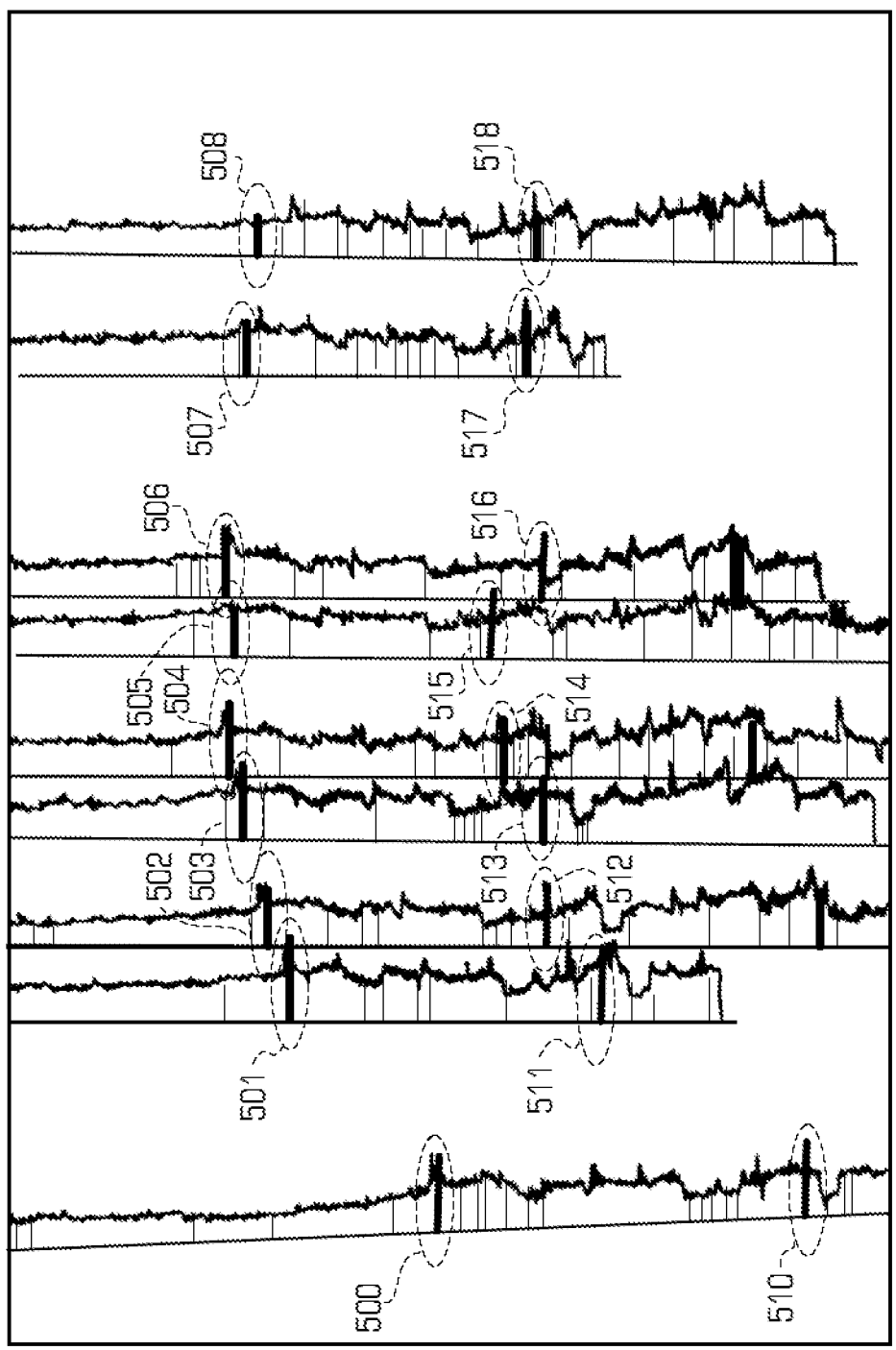
FIG. 5 depicts an example three-dimensional plot of well logs positioned according to location with two well tops identified across multiple well logs.

The user may also have the option of providing limits and thresholds for the system (operation 420). For example, the system may receive a minimum confidence threshold for automatically selected picks. Similarly, the system may receive a minimum quality threshold for automatically selected picks. The user may also optionally provide the system with limits for confining the correlation analysis to certain stratigraphic information, such as, for example, a certain stratigraphic interval. For example, FIG. 5 depicts nine well logs from nine well bores where a first well top 500-508 and a second well top 510-518 have already been identified. In this case, a user may elect to confine analysis according to the previously correlated well tops. For example, the user may elect to correlate a well top that is located at a higher depth than the first well top 500-508. In this case, there's no need to perform correlation across the entire well logs since the well top being correlated will be located above the first well top 500-508. Likewise, the correlation may be confined to below the second well top 510-518 or between the well tops. The correlation may also be data-bounded according to a structural model where well logs are aligned in a Wheeler transform domain. The user may also create bounds for the correlation using previously correlated well tops.

Figure 6:
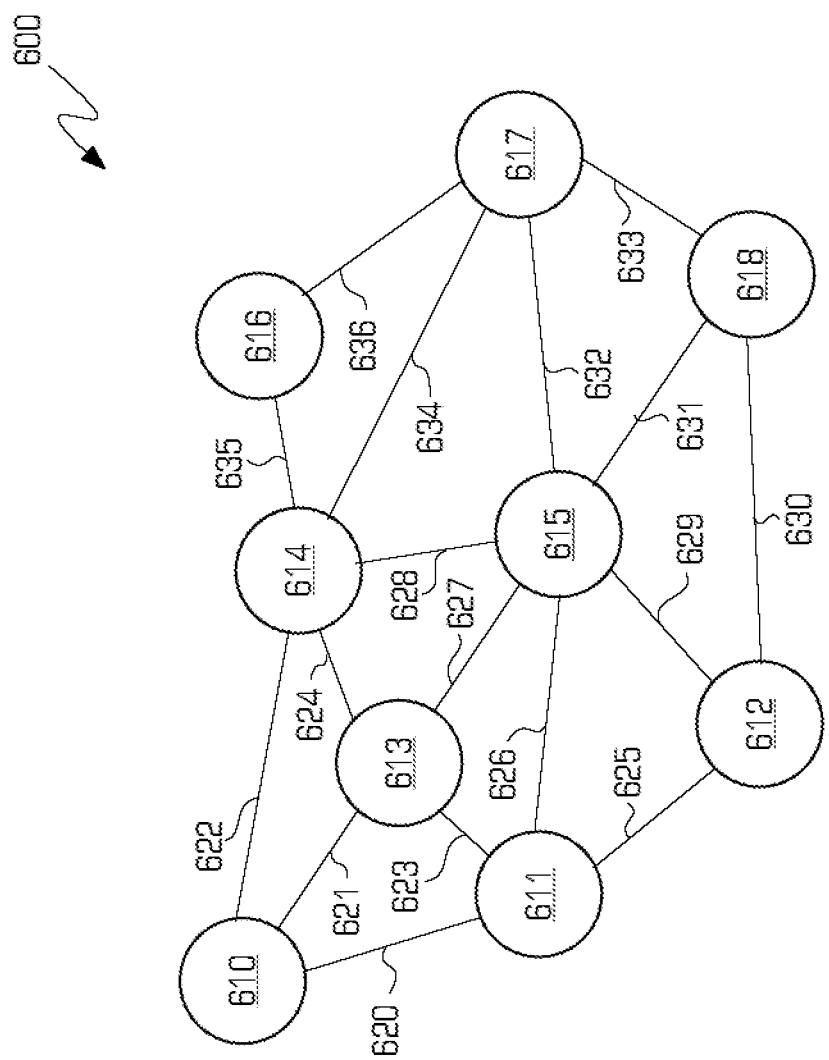
FIG. 6 depicts an example graph used for determining the natural neighbors of each well.

Referring back to FIG. 4, once a group of well logs have been selected for analysis and seed picks selected, the system may determine which well logs are from well bores that are in some sense neighbors of each other (operation 430). This may be done by constructing a graph based on the locations of each wellbore. For instance, the system may use the locations of each wellbore to create a weighted graph where the distances between nodes may be assigned according to the physical locations of each well. FIG. 6 provides an illustrative example of how the locations of node's 610-618 are positioned according to their physical locations relative to each other. The graph 600 may initially be a complete weighted graph where each pair of the vertices is connected by a distinct weighted edge and the edge weight is assigned according to the distance between the vertices. Then, using the locations of the vertices, the system may determine which nodes are natural neighbors using any natural neighbor selection method. For example, the system may perform Delaunay triangulation to determine the natural neighbors of each node by making edge connections that form triangles with circumcircles (circles that connect three vertices that form a triangle) that do not contain any nodes. For example, FIG. 6 only illustrates edges 620-652 connecting each pair of vertices that are natural neighbors according to Delaunay triangulation. Other graph connection strategies can be contemplated and are easily incorporated into the well log correlation algorithm. For example, the system may create a graph using any method and the neighbors may be those vertices that are connected, in the graph, to the original vertex (corresponding to the original well log) by an arc in the graph.

Referring back to FIG. 4, once the confidence priority queue has been initialized with the seed picks and the neighbors established, the system may begin performing by selecting the pick located at the front of the queue (operation 440). A correlation, such as dynamic time warping may then be performed on the neighbors of the pick (operation 450). Other possible correlation algorithms that may be used include a cross-correlation or a cross correlation while applying systematic shifting, stretching, or squeezing of the source data series to that of the target data series. The correlation may operate by measuring the similarity between two sequences of data. In this case, the correlation may specifically configured to find a portion of a relatively large sequence of data that most closely resembles a relatively small sequence of data.

For example, when dynamic time warping is applied to well logs, the system may determine which portion of a second well log is most similar to a specific portion of a first well log. This may be done by supplying the system with a "source" sequence of data. The source may be the portion of a well log that is associated with, initially, a seed pick, and performing dynamic time warping with the source data and second well log to identify the portion of the second well log that most closely resembles the source. The system may then consider this best match to be a part of the same well top as the one identified by the seed pick. The identified best match may be used at a later time as the source for performing dynamic time warping on other well logs.

Dynamic time warping involves finding a sequence in a target that is the most similar to a source. One advantage of dynamic time warping is that it allows for a comparison of two sequences that may vary in time, speed, or distance. This allows for the system to correlate well tops despite the well tops varying in width and depth. One method of performing dynamic time warping is subsequence dynamic time warping. Subsequence dynamic time warping is especially suited for situations where the source is much smaller than the target. An initial cost matrix (C[i][j]) of the "distance" between each source or target pairing may be computed. This computation may be described by equation 1:

$$C[i][j] \sum_{n=1}^{nLogs} w_n * (SOURCE[i][n] - TARGET[j][n])^2 \quad (1)$$

for $i = 1, M + 1, j = 1, N$ where $w_n$ is a specified weight of each input well log and source[i] and target[j] are the corresponding well logs for the source and target in a two-dimensional array of size M and N. Any number of local minima may be logged. An accumulated cost matrix may then be computed by accumulating the distances computed in the initial cost matrix. Using the locations of the local minima, the system may then backtrack from the locations of the local minima in the accumulated cost matrix to where the cumulative cost matrix reaches zero. The path taken through the accumulated cost matrix during the backtracking is then saved as the optimal warping path. Further details and examples describing subsequence dynamic time warping can be found in Appendix A that is incorporated herein by reference.

The system may also compute a quality value for each pick made by dynamic time warping or other type of correlation and a cumulative confidence (operation 460). The quality value provides a quality measurement indicating the similarity between the selected target pick and the source. The computation of the quality value for a match may be accomplished using any available method. In on example, the system may compute a quality value for the pick itself and a cumulative confidence value that incorporates the pick that the pick is based on. The cumulative confidence value may be calculated monotonically as a non-increasing function of the cumulative confidence value of the source and the quality value of the current pick. For example, if a pick made by dynamic time warping has a quality value of 0.9 and the source used for making the pick had a confidence value of 0.9, and then the cumulative confidence values may be a combination of the quality and confidence values using a monotonically non-increasing function.

In one example, the system may compute a Pearson quality measure (q) between the source and target. The Pearson quality measure is described by equation 2:

$$q = \frac{\sum_{i=1}^{n}(X_i - \overline{X})(Y_i - \overline{Y})}{\sqrt{\sum_{i=1}^{n}(X_i - \overline{X})^2}\sqrt{\sum_{i=1}^{n}(Y_i - \overline{Y})^2}} \quad (2)$$

where X and Y represent the correlated data sequences entered in the warping function. As stated above, the system may be configured to utilize quality values ranging from 0 to 1. Thus, any negative correlations found may be set to have a value of 0 since we are not interested in inverse correlations A cumulative confidence value for the pick made at the target node may be calculated by acquiring the confidence value of the pick from the source and multiplying it by the quality value of the current target pick. This relationship may be described by equation 3:

$$C(i+1) = C(i)*q(i,i+1) \quad (3)$$

Where C(i) is the confidence value of the source and q is the quality value of the pick. Thus, the cumulative confidence value of a new pick is a function of the confidence value of the source pick. For example, if the confidence value of the source is 0.9 and the quality value of the new pick is 0.9, then the cumulative confidence value may be the product of the two values (0.81).

For each pick determined by dynamic time warping, an element is added to the confidence priority queue that identifies the pick and includes the confidence value (operation 480). In some instances, the system may reject picks that fall below a quality value or cumulative confidence value (operation 470). Picks that meet the confidence threshold may be added to the confidence priority queue (operation 480).

Referring back to FIG. 6, if a seed pick is at node 610, then the correlation will begin at node 610's neighbors, here nodes 611, 613, and 614. The correlation would result in a pick being made at each of the nodes with each pick being assigned a confidence value. These picks are then added to the confidence priority queue. The system then performs correlation on the new highest confidence pick in the queue. For example, if node 613 yields the highest confidence pick, then the pick at node 613 is used for the next round of correlations. The natural neighbors of node 613 include node 611, node 615, and node 614. Correlation between the pick at node 613 is then performed on each natural neighbor (nodes 611, 615, and 614). In this case, the result of the correlation of node 615 is added to the queue, but nodes 611 and 614 have already been correlated and have corresponding picks already present in the queue. When a pick is already in the queue, the confidence of the pick may be compared to the confidence of the new pick. If the new pick has a higher confidence, then the confidence is used to update the confidence of the pick in the queue and the queue is appropriately reordered. If the confidence in the new pick is lower than the corresponding one in the queue, the new pick is discarded.

It should be understood that the use of dynamic time warping, Delaunay triangulation, and a Pearson quality measure, represent a single implementation of the system for automatically correlating geologic tops. Other methods or algorithms may be used instead of the provided methods. The system is configured to measure the similarity between two well logs from neighboring wells. More specifically, the system is configured to identify a portion of a well log that is the most similar to a specified source portion of another well log. This identified portion may then be used as a source for measuring the similarity between the source portion and the well logs of any neighboring wells. Each time a pick has been identified it may be assigned a confidence value. This confidence value may be a function of how similar the identified pick is to the source pick and the confidence value of the source pick. Thus, the confidence value is a monotonically non-increasing cumulative confidence measure. Furthermore, the well log locations may be inputted into a fully or partially-connected graph and any method may be used to determine the neighbors of a well.

The system may also utilize any algorithm for maximizing the cumulative confidence value for every correlated well log and produce a unique result that is reproducible. For example, by adding each correlated pick to the confidence priority queue and then performing correlation on the neighbors of the current highest confidence pick, the system is traveling through the well logs along a path with the highest confidence. This is similar in operation to a longest path or maximum spanning tree algorithm. In one example, a shortest path algorithm may be used by inverting the cumulative confidence value. In other examples, parallel relaxation algorithms may be used.

Figure 7:
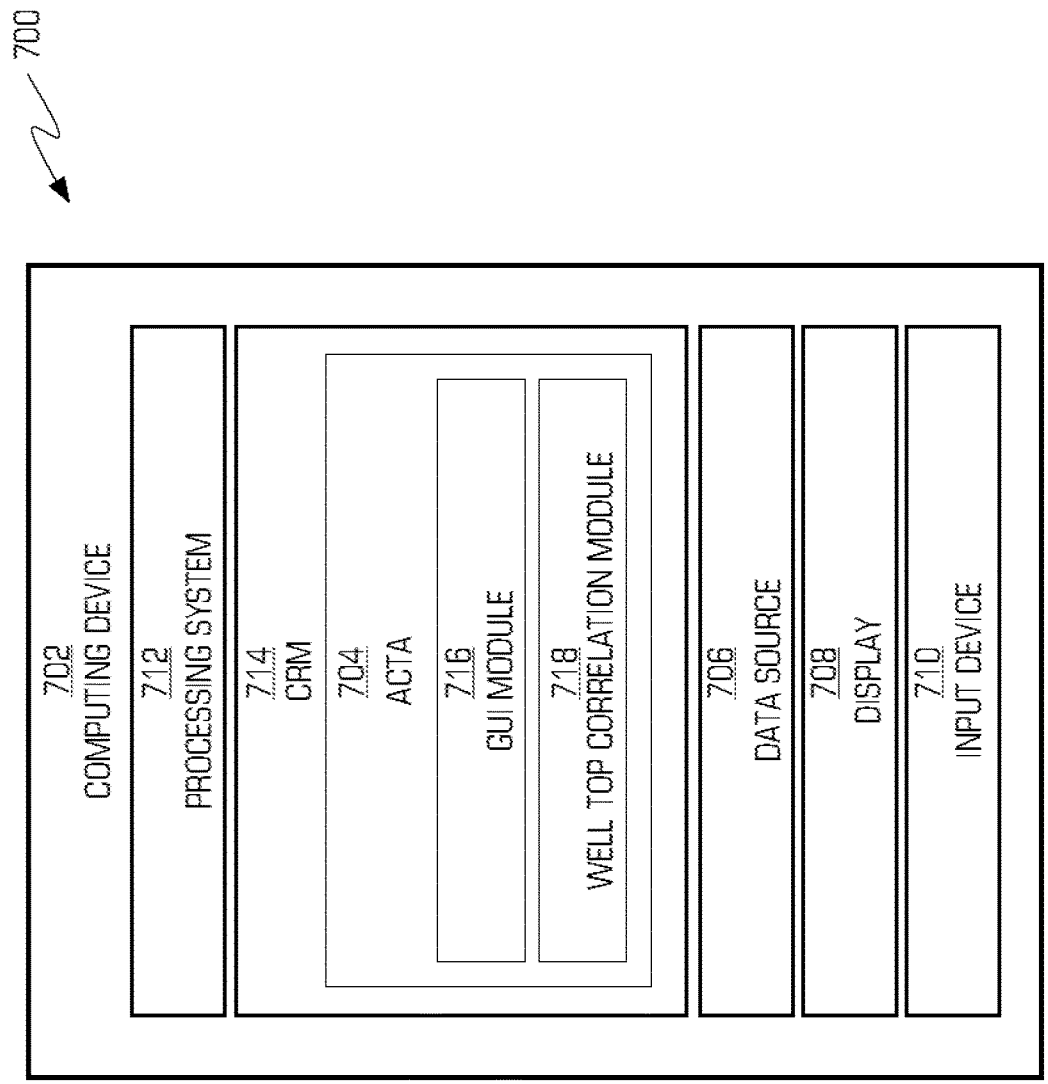
FIG. 7 is a block diagram illustrating an example of a general purpose computing system that may be used to implement a system for automatically correlating geologic tops.

FIG. 7 depicts an exemplary automated tops correlation system (ATCS) 700 in accordance with aspects of the invention. The ATCS 700 includes a computing device 702 or other computing device or system that includes an automated tops correlation application (ATCA) 704. The ATCS 700 also includes a data source 706 that stores well logs. Although the data source is illustrated as being located on the computing device 702, it is contemplated that the data source 706 may be a database that is located on another computing device or computing system that is connected to the computing device 702.

The computing device 702 can be a laptop computer, a personal digital assistant, a tablet computer, a smart phone, standard personal computer, or another processing device. The computing device 702 includes a display 708, such as a computer monitor, for displaying data and/or graphical user interfaces. The computing device 702 may also include an input device 710, such as a keyboard or a pointing device (e.g., a mouse, trackball, pen, or touch screen) to interact with various data entry forms to submit image slice selection data and/or surface fault point input data.

According to one aspect, a displayed group of well logs is itself an entry form that is responsive to user input. For example, the user of the computing device 702 can interact with well logs to submit seed pick selection data by using the mouse to select a particular region of a well log. It is also contemplated that the user may submit seed pick selection data by interacting with one or more displayed fields (not shown) to enter coordinates corresponding to a particular section of a well log. After entering the seed pick selection data, a seed pick selection request is generated and provided to the ATCA 704 for processing.

According to one aspect, a displayed well log is itself another entry form that is responsive to user input. For example, the user of the computing device 702 can interact with the displayed well log to submit seed pick input data by using the mouse to select at least one particular point on the well log. It is also contemplated that the user may submit seed pick input data by interacting with one or more displayed fields (not shown) to enter coordinates corresponding to the at least one particular points. After entering and submitting seed pick input data, a well top correlation request is generated and provided to the ATCA 704 for processing.

Although the ATCS 700 is depicted as being implemented on a single computing device, it is contemplated that in other aspects the ATCA 704 may be executed by a server computing device (not shown) that receives the seed pick selection request, the well log selection request, and/or other input data from a remote client computer (not shown) via a communication network, such as the Internet.

According to one aspect, the computing device 702 includes a processing system 712 that includes one or more processors or other processing devices. The computing device 702 also includes a computer readable medium ("CRM") 714 configured with the ATCA 704. The ATCA 704 includes instructions or modules that are executable by the processing system 712 to perform interpretation on well tops in well logs.

The CRM 714 may include volatile media, nonvolatile media, removable media, non-removable media, and/or another available medium that can be accessed by the computing device 700. By way of example and not limitation, the CRM 714 comprises computer storage media and communication media. Computer storage media includes nontransient memory, volatile media, nonvolatile media, removable media, and/or non-removable media implemented in a method or technology for storage of information, such as computer readable instructions, data structures, program modules, or other data. Communication media may embody computer readable instructions, data structures, program modules, or other data and include an information delivery media or system.

A GUI module 716 displays a plurality of well logs received from, for example, the data source 706 in response to a well log retrieval request. The well log retrieval request is generated, for example, by a user of the computing device 702 interacting with a well log retrieval request (not shown). The well logs image can be displayed as described in connection with operations 400, 410, and 420 of FIG. 4.

As described above, the well logs each contain a plurality of measurements compiled into a three-dimensional image. The GUI modules 716 displays a particular well logs or group of well logs, such as described above in connection with operations 400 and 410 of FIG. 4, in response to a seed pick selection request.

A well top correlation module 718 generates indicators of a well top by performing dynamic time warping on well logs. The well top indicators correspond to the well tops designated by user selected seed picks at least a first location on a first well log such as described above in connection with operation 410 of FIG. 4.

According to one aspect, the well top correlation module 718 performs dynamic time warping starting at the highest confidence pick's natural neighbors, such as described in connection with operations 430, 440, and 450 of FIG. 4. The well top correlation module 718 may the move on to the next highest confidence pick and perform dynamic time warping on that pick's natural neighbors. This may be repeated until all of the well logs have been analyzed. According to another aspect, the well top correlation module 718 also assigns a confidence value to each pick that is made using dynamic time warping.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may

The invention claimed is:

1. A method for automatically correlating geologic tops using at least one processor, the method comprising:
   receiving a first well log of a first well bore and at least a second well log of a second well bore;
   receiving at least one seed pick designating a particular sequence of data in the first well log as a well top;
   determining, by the processor, at least one neighbor for each well log;
   defining, by the processor, a highest confidence series of well top picks by retrieving a highest confidence pick wherein the confidence of the pick is a non-increasing function of path length from the at least one seed and a non-increasing function of a quality of the pick, determining a new pick by performing correlation on each neighbor of the well log, assigning the new pick a pick quality value and generating the highest confidence series of well top picks; and
   displaying, on a display connected to the processor, a result of generating the highest confidence series of well top picks.

2. The method of claim 1, wherein performing correlation further comprises performing dynamic time warping on each neighbor of the well log.

3. The method of claim 1 further comprising displaying the first well log and the at least second well log and selecting, by a user, a seed pick for the display of the first well log and the at least second well log.

4. The method of claim 1, wherein receiving at least one seed pick further comprising assigning a high confidence value to the at least one seek pick.

5. The method of claim 3, wherein selecting the seed pick further comprises assigning a high confidence value to the at least one seek pick.

6. The method of claim 1 further comprising displaying the highest confidence series of well top picks.

7. The method of claim 1, wherein determining at least one neighbor for each well log comprises adding each well log to a complete weighted graph, wherein each well log is represented by a vertex, and each edge weight represents a distance between a first well log and a second well log and determining at least one neighbor for each vertex.

8. The method of claim 1, wherein receiving the first well log and the at least second well log further comprises selecting, by a user, the first well log and the at least second well log.

9. The method of claim 7, wherein the determining at least one neighbor for each well log further comprises using Delaunay triangulation.

10. A method for automatically correlating geologic tops using at least one processor, the method comprising:
    receiving a first well log and at least a second well log;
    receiving at least one seed pick designating a particular sequence of data in the first well log as a well top;
    adding, by the processor, the at least one seed pick to a confidence priority queue, wherein the confidence priority queue is configured to assign a priority based on a confidence value and wherein at least one seed pick is assigned a maximum priority and wherein the confidence value of the pick is a non-increasing function of path length from the at least one seed and a non-increasing function of a quality of the pick;
    determining, by the processor, at least one neighbor for each well log;
    defining, by the processor, a highest confidence series of well top picks by traversing the confidence priority queue until the queue is empty by retrieving a first element from the confidence priority queue and removing the first element from the queue, determining a new pick by performing correlation on each neighbor of the first element, assigning the new pick a pick quality value, adding the new pick to the confidence priority queue according to the confidence value and generating the highest confidence series of well top picks; and
    displaying, on a display connected to the processor, a result of generating the highest confidence series of well top picks.

11. The method of claim 10, wherein adding the new pick to the confidence priority queue comprises adding the new pick to the confidence priority queue when a quality value of the pick exceeds at least one of a quality threshold and a cumulative confidence threshold.

12. The method of claim 11, wherein the quality value of the pick is determined by:

$$q = \frac{\sum_{i=1}^{n}(X_i - \overline{X})(Y_i - \overline{Y})}{\sqrt{\sum_{i=1}^{n}(X_i - \overline{X})^2}\sqrt{\sum_{i=1}^{n}(Y_i - \overline{Y})^2}}$$

where X and Y represent the correlated data sequences entered in the warping function.

13. The method of claim 10 wherein adding the new pick to the confidence priority queue further comprises:
    searching the confidence priority queue for an element corresponding to the new pick;
    updating the element corresponding to the new pick when the confidence priority queue contains the element corresponding to the new pick and the pick confidence value exceeds an element confidence value defining the confidence of the element; and
    adding the new pick to the confidence priority queue when the confidence priority queue does not contain the element corresponding to the new pick.

14. The method of claim 10, wherein determining at least one neighbor for each well log comprises:
    adding each well log to a complete weighted graph, wherein each well log is represented by a vertex, and each edge weight represents a distance between a first well log and a second well log; and
    determining at least one neighbor for each vertex using Delaunay triangulation.

15. The method of claim 10, wherein the quality value is determined using a Pearson quality measure.

16. The method of claim 15, wherein the new confidence value is a function of the Pearson quality measure and the confidence value.

17. The method of claim 10, wherein performing correlation further comprises performing dynamic time warping on each neighbor of the well log.

18. The method of claim 10 further comprising displaying the first well log and the at least second well log and selecting, by a user, a seed pick for the display of the first well log and the at least second well log.

19. The method of claim 10 further comprising displaying the highest confidence series of well top picks.

20. The method of claim 10, wherein receiving the first well log and the at least second well log further comprises selecting, by a user, the first well log and the at least second well log.

21. An apparatus, comprising:
a computer system having at least one processor, memory and display, wherein the processor is configured to:
receive a first well log of a first well bore and at least a second well log of a second well bore;
receive at least one seed pick designating a particular sequence of data in the first well log as a well top;
determine at least one neighbor for each well log; and
define a highest confidence series of well top picks by retrieving a highest confidence pick wherein the confidence of the pick is a non-increasing function of path length from the at least one seed and a non-increasing function of a quality of the pick, determining a new pick by performing correlation on each neighbor of the well log, assigning the new pick a pick quality value and generating the highest confidence series of well top picks; and
the display displaying a result of generating the highest confidence series of well top picks.

22. The apparatus of claim 21, wherein the processor is configured to perform dynamic time warping on each neighbor of the well log.

23. The apparatus of claim 21, wherein the computer system has a display that displays the first well log and the at least second well log.

24. The apparatus of claim 23, wherein the computer system has an input device that is configured to allow a user to select the seed pick for the display of the first well log and the at least second well log.

25. The apparatus of claim 21, wherein the processor is configured to assign a high confidence value to the at least one seek pick.

26. The apparatus of claim 23, wherein the display displays the highest confidence series of well top picks.

27. The apparatus of claim 21, wherein the processor is configured to add each well log to a complete weighted graph, wherein each well log is represented by a vertex, and each edge weight represents a distance between a first well log and a second well log and determine at least one neighbor for each vertex.

28. The apparatus of claim 21, wherein the processor is configured to add the at least one seed pick to a confidence priority queue, wherein the confidence priority queue is configured to assign a priority based on a confidence value and wherein at least one seed pick is assigned a maximum priority.

29. The apparatus of claim 28, wherein the processor is configured to define the highest confidence series of well top picks by traversing the confidence priority queue until the queue is empty by retrieving a first element from the confidence priority queue and removing the first element from the queue, determining a new pick by performing correlation on each neighbor of the first element, assigning the new pick a pick quality value, adding the new pick to the confidence priority queue according to the confidence value and generating the highest confidence series of well top picks.

30. The apparatus of claim 21, wherein the processor is configured to add the new pick to the confidence priority queue when a quality value of the pick exceeds at least one of a quality threshold and a cumulative confidence threshold.

31. The apparatus of claim 30, wherein the quality value of the pick is determined by:

$$q = \frac{\sum_{i=1}^{n}(X_i - \overline{X})(Y_i - \overline{Y})}{\sqrt{\sum_{i=1}^{n}(X_i - \overline{X})^2}\sqrt{\sum_{i=1}^{n}(Y_i - \overline{Y})^2}}$$

where X and Y represent the correlated data sequences entered in the warping function.

32. The apparatus of claim 21, wherein the processor is configured to search the confidence priority queue for an element corresponding to the new pick, update the element corresponding to the new pick when the confidence priority queue contains the element corresponding to the new pick and the pick confidence value exceeds an element confidence value defining the confidence of the element and add the new pick to the confidence priority queue when the confidence priority queue does not contain the element corresponding to the new pick.

33. The apparatus of claim 21, wherein the computer system further comprises one of a computer and one or more computing resources.

34. The apparatus of claim 33, wherein the one or more computing resources are one of one or more server computing devices and one or more cloud computing resources.

35. The apparatus of claim 34 further comprising a computing device used a user to access the one or more server computing devices.

36. The apparatus of claim 27, wherein the processor is configured to determine the at least one neighbor for each vertex using Delaunay triangulation.

* * * * *